United States Patent Office 3,061,603
Patented Oct. 30, 1962

3,061,603
POLYMERIZATION OF ETHYLENE IN THE PRESENCE OF A HYDRIDE OF BORON AND OXYGEN CONTAINING CATALYST
John D. Calfee and William R. Richard, Jr., Dayton, and Lowell E. Erbaugh, Vandalia, Ohio, assignors to Monsanto Chemical Company, St. Louis, Mo., a corporation of Delaware
No Drawing. Filed June 10, 1959, Ser. No. 819,244
8 Claims. (Cl. 260—94.9)

The present invention is directed to the high pressure polymerization of ethylene by use of a boron hydride and oxygen catalyst under high pressure to obtain high density, high molecular weight polymers of ethylene.

It has previously been known to polymerize ethylene in the presence of hydrides of boron. However, prior workers did not employ high pressures and the controlled addition of oxygen, oxygen gases or oxygen generating materials with the boron hydrides to obtain high molecular weight, high density polyethylene resembling that obtained by Ziegler catalyzed polymerization.

As an important aspect of the invention, the oxygen is introduced into the reactor containing a boron hydride and ethylene at high pressure, the reaction being controlled and the efficiency of the catalyst being improved by this procedure. In addition, it is convenient to be able to adde the catalyst components separately and have the active catalyst formed in situ, thus avoiding the problem of handling and preserving the activity of an unstable catalyst. Moreover, the continued addition of oxygen is effective in maintaining a catalyst of uniform activity throughout the reaction period.

The polymerization procedure of the present invention has a number of other important advantages. The polymerization can be initiated and carried out at low temperatures, e.g., those not over about 100° C. or so and very good results are obtained at 0° C., and good results are obtained at even lower temperatures. An additional advantage is the fact that no difficulty removable catalyst residues are formed in the polymerization and polyethylene of acceptable properties can be readily isolated from the polymerization mixture. Moreover, in the case of tubular reactors the feasibility of adding the oxygen catalyst separately has advantages in avoiding undesirable deposits in the inlet end of the reactor, i.e., in maintaining "front-end" reactor cleanliness.

The reaction can feasibly be controlled by an alternative method involving the use of small amounts of boron hydride as catalyst in combination with the oxygen, the amounts being so small that the heat of reaction can be readily dissipated as the low concentration of boron hydride prevents the simultaneous reaction of large amounts of ethylene, and the temperature being too low for effective catalysis by oxygen alone, and then adding additional increments of boron hydride catalyst as necessary as the reaction proceeds toward completion. It will be readily be appreciated, in view of the present invention, that a much more preferable method of control is to effectively regulate the concentration of the active catalyst by keeping the concentration of oxygen dilute at all times, in particular by adding the oxygen in small, regulated amounts and only when high concentrations of ethylene, e.g., more than 10,000 p.s.i., are already present; however, the procedure of adding the boron hydride to an ethylene and oxygen mixture at pressures above 10,000 p.s.i., can also be employed.

As the boron hydride component employed in the present invention, completely inorganic hydrides of boron containing only hydrogen and boron atoms are included, as well as organoboron hydrides, particularly monoalkyl borohydrides and dialkyl borohydrides, all of which hydrides of boron are characterized by at least one boron-to-hydrogen bond.

As completely inorganic hydrides useful as the boron hydride component in the present invention, representative relatively stable compounds are diborane ($B_2H_6$), pentaborane ($B_5H_9$), hexaborane ($B_6H_{10}$) and decaborane ($B_{10}H_{14}$), but other less stable hydrides of boron such as $BH_3$, $B_4H_{10}$, $B_5H_{11}$, and $B_6H_{12}$ which readily decompose to various polymeric hydrides of boron can also be employed, as can various homologs and analogs of the foregoing, particularly those having from 1 to 10 or so boron atoms.

Other hydrides of boron useful in the present invention are the mixed hydride-hydrocarbon derivatives of boron, as represented for example by any of the foregoing hydrides of boron in which at least one but not all of the hydrogens have been replaced by hydrocarbon groups, for example, by aryl or alkyl groups such as phenyl or methyl groups. Such hydrides can for the most part be represented by the formula $B_nR_{n+4}$ in which $n$ is 1 to 10 and each R is selected from hydrogen and monovalent hydrocarbon radicals, and at least one R is hydrogen. A few such representative boron hydrides which are suitable, are, for example, diethylhydroborane, dihydroethylborane, dihydromethylborane, dimethyldiborane, ethyldiborane, dihydro-n-propylborane, dihydroisopropylborane, butyldihydroborane, dioctylhydroborane, dihydrophenylborane, as well as other alkyl, cycloalkyl, aryl, etc. hydroboranes. It may well be that alkyl hydroboranes are produced in situ in the reaction of monomers with the boron hydrides, $B_xH_y$, as for example when $B_2H_6$ is contacted with ethylene in the presence of oxygen, and the use of such alkyl hydroboranes is contemplated as within the invention whether added as such or produced in situ.

The oxygen catalyst component employed in the present invention will generally be free oxygen, oxygen in air, or oxygen in admixture with other gases, or with ethylene; however it is possible and sometimes advantageous to employ other oxygen containing or oxygen generating compounds. The oxygen or peroxygen compounds suitable as oxygen components of the initiator employed in the present invention, are, for example, oxygen, either added as such or generated in situ by addition of oxygen generating compounds, and including oxygen added as a component of gases such as air; and peroxygen compounds, particularly organic peroxygen compounds, capable of generating free radicals when heated below 200° C. such as hydrogen peroxide, dicumyl peroxide, benzoyl peroxide, lauroyl peroxide, diethyl peroxide, ditertiarybutyl peroxide, diisopropyl peroxide, hydroxymethyl hydroperoxide, tertiarybutyl hydroperoxide, ethyl hydroperoxide, acetoperacid, benzoperacid, succinic monoperacid, phthalic peracid, trimethylacetoperacid, ethyl percamphorate, ethyl perbenzoate, tertiarybutyl perbenzoate, etc., and any other peroxide or peroxygen compounds capable of employment as free radical polymerization catalysts. While the description herein will be primarily directed to use of oxygen itself as a catalyst component, it will be realized that the description is pertinent to the oxygen catalyst adjuvants in general, it only being necessary for the most part to substitute equimolar amounts of organic or other peroxygen compound for oxygen in any procedure.

It will be realized that the boron hydrides in combination with oxygen or peroxygen compounds are effective initiators for polymerization of ethylene without the necessity for any other metal salts or compounds and that the presence of other metal salts such as $TiCl_4$ and the like while permissible is not required and in some cases might even be deleterious to the free radical catalyzed polymerization; i.e., in one preferred embodiment it is contemplated that a hydride of boron be the sole metal compound employed in the polymerization.

The polymerizations according to the present invention can be effected at relatively low polymerization temperatures, such as room temperature or the like, thereby avoiding the necessity of heating the reactants with possible deleterious effects on the properties of the resulting polymers. Thus the polymerization can suitably be effected at temperatures of about −100° C. to 100° C., to produce polymers characterized by properties resulting from low temperature polymerization, temperatures of about 0° C. to 50° C. being particularly suitable. Controlling the temperature provides a method of controlling density of the resulting polymer, as the density bears an inverse relationship to polymerization temperature. If desired, however, polymerizations can be effected at higher temperatures, up to 150° C. or so, employing the boron hydrides with addition of oxygen or peroxides as disclosed herein.

In one of its most important aspects the present invention can be considered as a method of effecting the low temperature, oxygen catalyzed, high pressure polymerization of ethylene. Under ordinary conditions oxygen will not cause substantial initiation of ethylene polymerization except at temperatures above about 150° C. The present invention by the use of both a boron hydride and oxygen provides a method of carrying out the polymerization at much lower temperatures, for example, having substantially the entire polymerization occur below about 100° C., or even below about 50° C., and obtaining high molecular weight, high density polyethylene. As the boron hydride and oxygen catalyst combination, especially $B_2H_6$ and oxygen, is very reactive it will often be desirable to initiate polymerization therewith at lower than normal temperatures in order to minimize control problems, for example at reactor jacket temperatures less than 20° C., and often at temperatures below 0° C.

Regulating the rate of addition of the oxygen is an effective control method. Thus, in the presence of sufficient amounts of a boron hydride to effect a rapid, uncontrolled polymerization of ethylene if uncontrolled amounts of oxygen were immediately added, it is possible to so control the oxygen addition as to effect an efficient, reasonably rapid conversion of the ethylene to high molecular weight, high density polyethylene, without adding so much oxygen as to make it impossible to dissipate the heat of the exothermic polymerization thereby causing undue rises in the reaction temperature and resulting deterioration or carbonization of the product. For example, the oxygen can be added at a rate sufficient to avoid temperatures in excess of 100° C. for any substantial part of the polymerization cycle. The controlled addition of the oxygen will be especially necessary when relatively high amounts of boron hydride are employed, although the effectiveness of heat transfer systems and other factors will have a considerable influence upon the need for carefully controlled oxygen addition. The addition of oxygen makes it possible to employ extremely small amounts of a hydride of boron, for example, amounts as low as 0.0005% or lower by weight based on the weight of polymerizable monomer, and with controlled addition of oxygen, it is possible to employ amounts up to 0.01% by weight, or even up to 0.05% or 0.1% or more by weight. The oxygen can be employed in similar percentages by weight, but amounts from less than 0.0001% up to 0.01% or more by weight are ordinarily the more suitable ranges, and even in these ranges it is generally necessary or desirable to regulate the rate of addition of the oxygen. The regulated addition of oxygen provides a control of polymerization temperature, making it possible to conduct substantially the entire polymerization within a narrow temperature range, for example, near 0° C., with consequent uniformity of product.

While the regulated addition of oxygen is the preferred procedure, it is also possible to control the polymerization by regulated addition of boron hydride to an ethylene and oxygen mixture.

With the present method of controlling the polymerization it is not necessary to employ a chain transfer agent, such as an alkane of 3 to 6 carbon atoms or the like, to control the polymerization, but use of such agents may have certain advantages, particularly at lower temperatures, and their use will be discussed more fully hereinbelow.

The polymerization of the present invention can occur in bulk, in aqueous solution, in aqueous or non-aqueous emulsion, or in solution in hydrocarbon or other organic solvents and the like, and can also occur in gaseous or vapor phase. The advantages of the invention are especially apparent in bulk polymerization.

It is advantageous to have at least about one-half of the total amount of oxygen catalyst employed added after the pressure has been raised to 10,000 p.s.i. or greater, and preferably at least about three-fourths of the oxygen catalyst added after such pressure have been attained.

The mechanism by which boron hydrides and oxygen catalyze the polymerization of ethylene is not certain. However, it may be that the boron hydrides serve as a low temperature initiator to trigger the oxygen catalyst, and that it is advantageous to have sufficient ethylene present when the oxygen catalyst and boron hydride come into contact so that the catalyst components are not unduly expended in reacting together, but will rather be efficiently utilized in effecting the polymerization of ethylene. It is also possible that to some extent oxygen catalyzes the reaction of ethylene with boron hydride to produce $BH_2(C_2H_5)$ or possibly $BH(C_2H_5)_2$; and that one of the latter compounds in the presence of oxygen is an effective catalyst; it appears very unlikely that the boron hydride is converted to triethylborane to any substantial degree, as the boron hydride catalysts in combination with oxygen are much more active and effective in smaller amounts to cause polymerization than are the trialkyl boranes in combination with oxygen.

While ordinarily relatively small amounts of a boron hydride are employed, as discussed above, in some cases and with employment of suitable means for regulating the oxygen addition and controlling the polymerization initiation temperature, larger amounts of a boron hydride, for example up to 5% or more by weight of the ethylene, can be employed.

The invention is illustrated by the following examples in which for sake of convenience $B_2H_6$ is employed as an exemplification of boron hydrides.

*Example 1*

To a jacketed reactor which had been flushed with nitrogen, $B_2H_6$, 0.002 gram, and ethylene, about 175 grams, were charged and maintained at about 25,000 p.s.i. for a number of hours with the jacket temperature at 30° C. The internal temperature remained at 30° during this interval, indicating that polymerization had not occurred in the absence of oxygen. Then 0.03 gram of oxygen diluted with ethylene was added, causing the internal temperature to surge to 75° C., and polymerization to occur. The solid polymerizate, 34 grams, was removed from the reactor. High molecular weight polyethylene, i.e., polyethylene having weight average molecular weight ($M_w$) greater than 100,000, and having density greater than 0.925 can conveniently be prepared by the foregoing procedure.

*Example 2*

The procedure of Example 1 was essentially repeated except that the addition of oxygen was omitted. Only a trace of polymer, about 0.7 gram, was obtained and it was oily and waxy in character.

*Example 3*

A reactor was charged with about 0.01 gram of $B_2H_6$ and 175 grams ethylene and a very small amount of air. The temperature in the reactor maintained at a pressure of 25,000 p.s.i. rose to a maximum of 80° C. When the reactor was opened after 3 hours, a 28 gram amount of high molecular weight polyethylene was obtained.

The process of the present invention will be generally useful in producing polymer of narrow molecular weight distribution and having molecular weights ($M_w$) greater than about 100,000 up to 300,000 or more, or even up to 500,000 or 1,000,000 or more, and in producing polymer of density greater than 0.925 and ordinarily in the range 0.925 to 0.94. The molecular weight ($M_w$) referred to is the weight average molecular weight as calculated from viscosity measurement.

While pressures around 25,000 p.s.i. or higher are very suitable in effecting polymerization according to the present invention to obtain high molecular weight, high density polyethylene, other pressures well over 10,000 p.s.i., for example 15,000 to 50,000 p.s.i. are similarly suitable, and pressures even up to 100,000 or 200,000 p.s.i. or greater can be employed effectively.

While the invention is particularly concerned with homopolymerization of ethylene, it is also contemplated to utilize small amounts of copolymerizable monomers along with the ethylene in preparing polymers of ethylene according to the present invention.

While the foregoing illustrations are in the main concerned with batch polymerization, it is possible to conduct similar continuous polymerizations in similar reactors or in highly elongated tubes, i.e., tubular reactors, by making suitable modifications as necessary. In the continuous polymerization, the present invention can be employed in tubular reactors along with the flow impulse feature, chain transfer agents and conditions described in the copending application of John D. Calfee, William R. Richard, Jr., Wallace G. Bir and Norval E. Jones, S.N. 712,339, filed on January 31, 1958, and with similar features in U.S. Patent 2,852,501 to William R. Richard, Jr., Robert K. Stewart, and John D. Calfee, assignors to Monsanto Chemical Company, issued September 16, 1958, and the present invention can also be employed in conjunction with the oxygen catalyst compositions described in copending application S.N. 797,350, of Oliver Des. Deex, Lowell E. Erbaugh, and John M. Butler. When employing continuous procedures it will probably be desirable to have sufficient boron hydride present and to add oxygen at a rate sufficient to effect 10 to 20% by weight conversion of ethylene to polyethylene per minute.

The polymers formed according to the present invention will be useful in general for molding resins and for the purposes for which Ziegler and high pressure polyethylene are suited, and will also have certain specialized uses in high temperature and electrical insulation applications for which it is especially suited; the polymers will be useful in the formation of transparent films for wrappings and other purposes.

We claim:

1. The method of preparing high molecular weight polymers of ethylene having weight average molecular weight greater than about 100,000 and density greater than about 0.925 which comprises polymerizing ethylene in the presence of a hydride of boron at pressures of greater than 10,000 p.s.i. by the controlled addition of oxygen catalyst, the hydride of boron being in amount no greater than 0.01% by weight of the ethylene and the oxygen catalyst in amount equimolar to about 0.0001 to about 0.01% oxygen by weight of the ethylene.

2. The method of claim 1 in which the oxygen catalyst is free oxygen.

3. The method of claim 1 in which the oxygen catalyst is a peroxygen compound.

4. The method of claim 1 in which the hydride of boron is $B_2H_6$.

5. The method of effecting a low temperature polymerization of ethylene at high pressures which comprises contacting a hydride of boron with ethylene at pressure in excess of 10,000 p.s.i. and providing controlled amounts of oxygen so that the reaction temperature never exceeds 100° C. as the ethylene polymerizes, the hydride of boron being in amount up to 0.1% by weight of the ethylene and the oxygen in amount of 0.0001 to 0.05% by weight of the ethylene.

6. The method of preparing polyethylene which comprises contacting a hydride of boron with ethylene at high pressure and then introducing oxygen catalyst, the hydride of boron being in amount up to 0.05% by weight of the ethylene and the oxygen in amount from about 0.0001 to about 0.01% by weight of the ethylene.

7. The method of claim 6 in which the hydride of boron consists of boron and hydrogen atoms.

8. The method of preparing polyethylene which comprises contacting ethylene at high pressure with a hydride of boron in an amount no greater than 0.01% by weight of the ethylene and in the presence of oxygen in an amount of about 0.0001 to about 0.01% by weight of the ethylene.

References Cited in the file of this patent

UNITED STATES PATENTS

| | | |
|---|---|---|
| 2,153,553 | Fawcett et al. | Apr. 11, 1939 |
| 2,462,680 | Sargent | Feb. 22, 1949 |
| 2,685,575 | Heiligmann et al. | Aug. 3, 1954 |